United States Patent
Wurl

[11] Patent Number: 5,201,597
[45] Date of Patent: Apr. 13, 1993

[54] COMPOUND ELEMENT

[75] Inventor: Willi Wurl, Niefern-Oeschelbronn, Fed. Rep. of Germany

[73] Assignee: Dr. Ing. h.c.F. Porsche AG, Fed. Rep. of Germany

[21] Appl. No.: 679,201

[22] Filed: Apr. 2, 1991

[30] Foreign Application Priority Data

Apr. 14, 1990 [DE] Fed. Rep. of Germany ....... 4012206

[51] Int. Cl.⁵ ..................... F16B 11/00; B21D 39/03
[52] U.S. Cl. ................................. 403/274; 403/285; 403/242; 29/522.1
[58] Field of Search ............... 403/242, 375, 381, 380, 403/285, 276, 274, 279, 278, 281; 29/509, 521, 522.1

[56] References Cited

U.S. PATENT DOCUMENTS

| | | |
|---|---|---|
| 2,205,725 | 6/1940 | Kavanagh . |
| 2,313,228 | 3/1943 | Domonkos . |
| 3,290,077 | 12/1966 | La Barge . |
| 3,970,400 | 7/1976 | Reid ...................... 403/242 |
| 4,162,861 | 7/1979 | Reid et al. ............... 403/242 |
| 4,351,620 | 9/1982 | Stritt et al. .............. 403/381 X |
| 4,356,888 | 11/1982 | Steenberg ................ 403/242 X |
| 4,831,711 | 5/1989 | Rapp ....................... 403/285 X |

FOREIGN PATENT DOCUMENTS

| | | |
|---|---|---|
| 0099240 | 1/1984 | European Pat. Off. . |
| 1180111 | 10/1964 | Fed. Rep. of Germany . |
| 3248072 | 1/1984 | Fed. Rep. of Germany . |
| 3423967 | 1/1986 | Fed. Rep. of Germany . |
| 3638048 | 5/1988 | Fed. Rep. of Germany . |
| 764771 | 3/1934 | France . |

Primary Examiner—Peter M. Cuomo
Attorney, Agent, or Firm—Evenson, McKeown, Edwards & Lenahan

[57] ABSTRACT

A compound element manufactured of light metal has at least one plate-shaped element and an oblong profile part. A deformable holding web is constructed on the plate-shaped element, the holding web interacting with a corresponding receiving device of the profile part in such a manner that, by the deforming of the holding web, a form-fitting joined connection of the compound element is established, in which edge portions of the holding web reach behind lateral undercuts of the receiving device. In order that the overall height of the connection area remains low, the low-cost, easily manufacturable compound element has the plate-shaped element and the profile part constructed as extruded profiles, and in that the holding webs on the plate-shaped element are arranged freely accessibly adjacent to flat exterior wall portions of the plate-shaped element.

16 Claims, 4 Drawing Sheets

COMPOUND ELEMENT

BACKGROUND AND SUMMARY OF THE INVENTION

The present invention relates to a compound element which is preferably manufactured of light metal and comprises at least one plate-shaped element and an oblong profile part formed by an extruded profile, a profiled deformable holding web being provided on the plate-shaped element and interacting with a corresponding receiving device of the profile part in such a manner that, by means of the deforming of the holding web, a form-fitting joined connection of the composite element is established in which edge portions of the holding web laterally reach behind undercuts of the receiving device.

A compound element of the initially mentioned type is indicated in the U.S. Pat. No. 3,290,077. In this compound element, an extruded profile made of light metal is used as the profile part, while the plate-shaped element is formed by a sheet metal part made of light metal.

This arrangement has the disadvantage that several high-expenditure bending or edging operations must be carried out on the edge areas of the plate-shaped element which require time and cost. In addition, the end-side holding webs of the plate-shaped element must be manufactured with relatively precise tolerances in order to ensure an operationally appropriate, rattle-free connection. Since the deforming of the holding web takes place by means of a tongs-type tool, a relatively large amount of space in the perpendicular direction is required for the inserting of this tool which causes a large overall height in the connection area.

An object of the invention is to provide a compound element in which the overall height of the connection area is low, is easily manufacturable, and is low-cost, while the stability of the connection is approximately as high as for a spot-welded connection.

This and other objects are achieved by the present invention which provides a compound element comprising at least one plate-shaped element and an oblong profile part. The plate-shaped element has substantially flat, exterior wall portions and a profiled deformable holding web that has edge portions. The plate-shaped element is formed by an extruded profile made of light metal and the holding webs are freely accessibly arranged adjacent to the wall portions of the plate-shaped element. An oblong profile part is formed by an extruded profile and has a receiving device corresponding to the holding web. The receiving device has undercuts, with the holding web interacting with the receiving device of the profile part in such a manner that by deformation of the holding web, a form-fitting joined connection of the compound element is formed, in which the edge portions of the holding web laterally reach behind the undercuts of the receiving device.

Principal advantages achieved by the present invention are that, by means of the development of the plate-shaped element and of the oblong profile part as an extruded profile made of light metal, a low-cost, light-weight compound element is provided. The approximately V-shaped holding webs arranged on the plate-shaped element adjacent to the plane exterior side can easily be deformed by means of a pressure piston of a pressing tool. The connection area of the compound element requires only a relatively low overall height. By means of the supported arms molded onto the plate-shaped element, the S-shaped molded-on part of the receiving device is form-fittingly enclosed on both sides so that a secure hooking-together takes place between the components of the compound element. The hooked-together connection has a stability that is similar to a spot-welded connection. By means of the concave construction of the floor portion of the receiving device, the holding web, by way of the dead center, is pressed downward and then springs back slightly. By means of the supporting arms on the plate-shaped element, a lateral bending-away of the S-shaped molded-on part is prevented. At the same time, by means of the supporting arms, a prefixing takes place between the profile parts and the plate-shaped elements of the compound element.

Other objects, advantages and novel features of the present invention will become apparent from the following detailed description of the invention when considered in conjunction with the accompanying drawings.

DETAILED DESCRIPTION OF THE DRAWINGS

Figure 1:
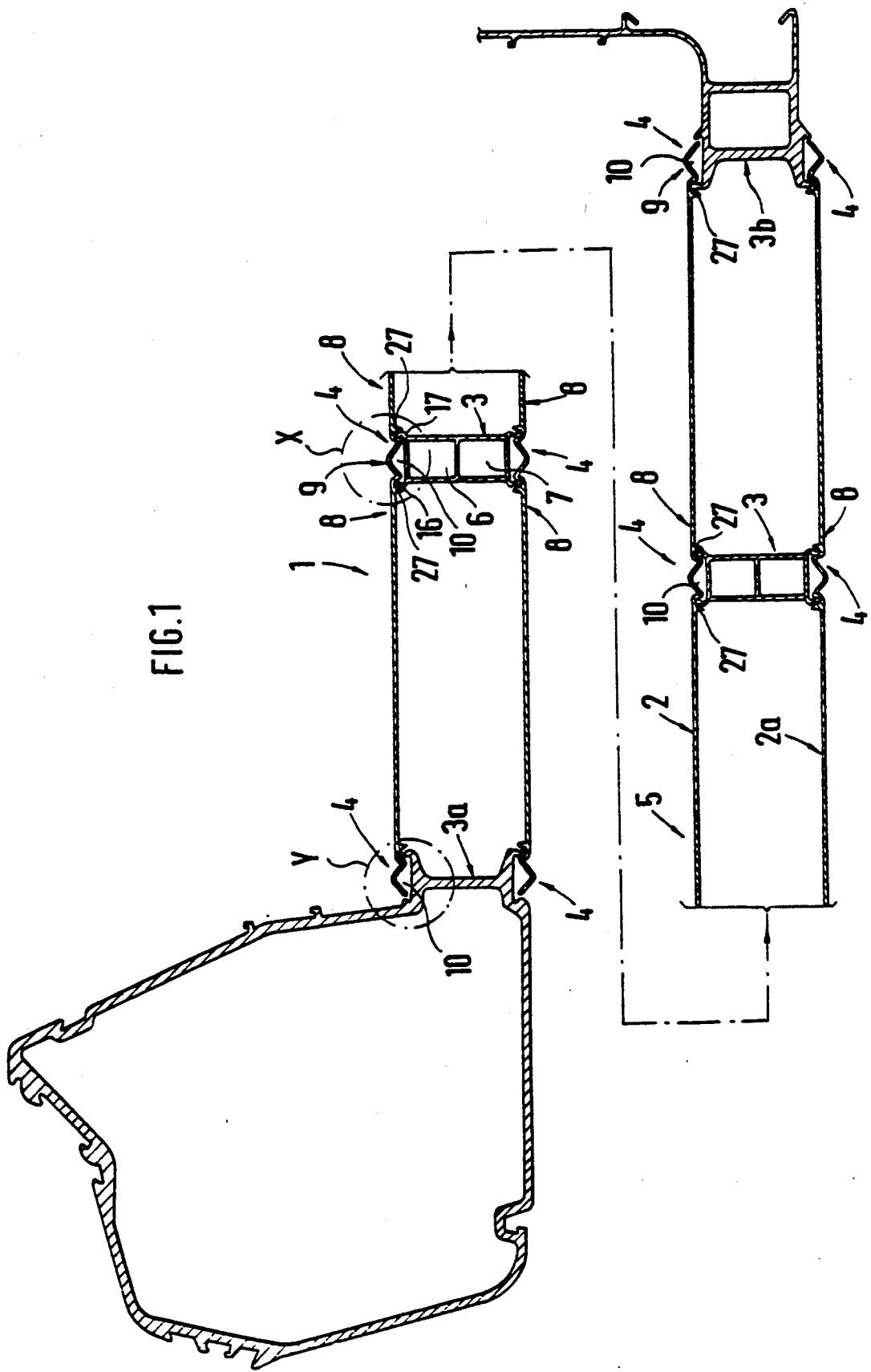
FIG. 1 is a sectional view taken transversely with respect to the longitudinal direction of the vehicle through a compound element, constructed in accordance with an embodiment of the present invention, of a vehicle body structure.

A compound element 1, which preferably is manufactured of light metal (aluminum, aluminum alloy, magnesium, or the like), comprises at least one plate-shaped element 2 and an oblong profile part 3 which, by means of deforming, are form-fittingly connected with one another on common connection areas 4.

The plate-shaped element 2 and the oblong profile part 3 are formed by extruded profiles which can be manufactured in a simple and low-cost manner. According to FIG. 1, the compound element 1 is formed by a doubled-wall frame floor 5 of a vehicle body structure. The frame floor 5 comprises an upper plate-shaped element 2, a lower plate-shaped element 2a, and locally arranged, longitudinally directed profile parts 3, 3a, 3b. The laterally exterior profile parts 3a and 3b are formed by a vehicle side member and a transmission tunnel.

Figure 6:
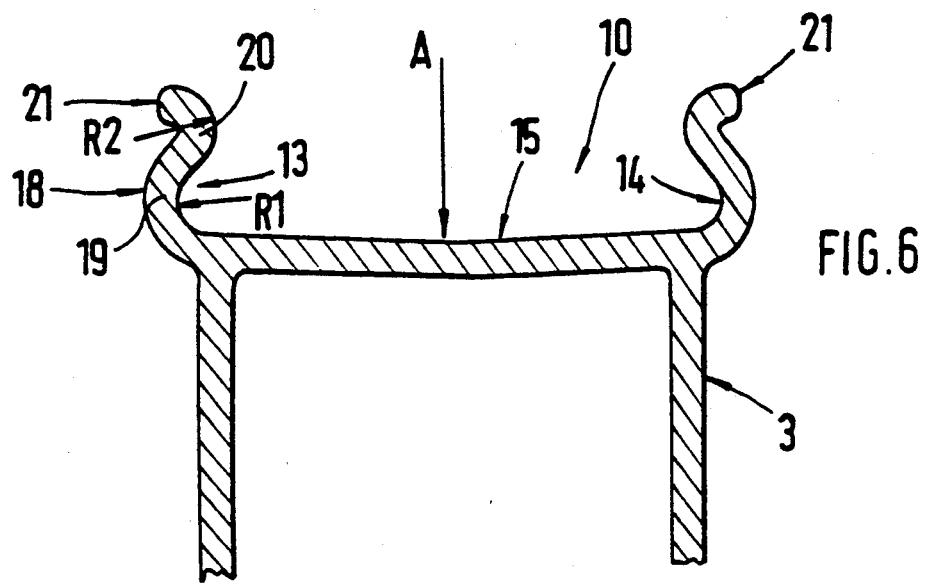
FIG. 6 is an enlarged cross-sectional view of the receiving device of the present invention.
Figure 7:
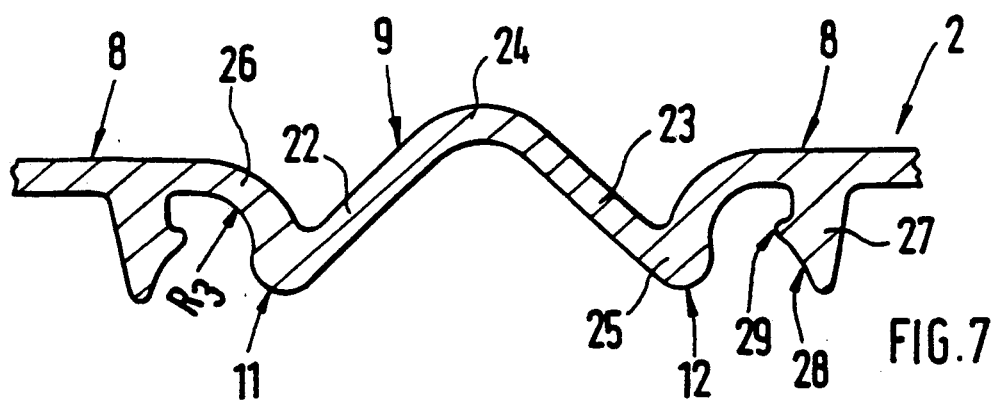
FIG. 7 is an enlarged cross-sectional view of the holding web and the supporting arms of the plate-shaped element of the present invention.

The profile parts 3 are constructed as closed hollow profiles which have two chambers 6, 7 disposed above one another. For the connection of the plate-shaped element 2, 2a with the profile part 3, 3a, 3b, locally deformable, profiled holding webs 9 are developed on the plate-shaped element 2, 2a adjacent to flat, exterior, horizontally extending wall portions 8. The holding webs 9 interact with corresponding receiving devices 10 of the profile part 3, 3a, 3b in such a manner that, by means of the deforming of the holding web 9, a form-fitting, joined connection of the compound element 1 is achieved. In this case, edge portions 11, 12 of the holding web 9 reach behind undercuts 13, 14 of the receiving device (FIGS. 6 and 7).

Figure 2:
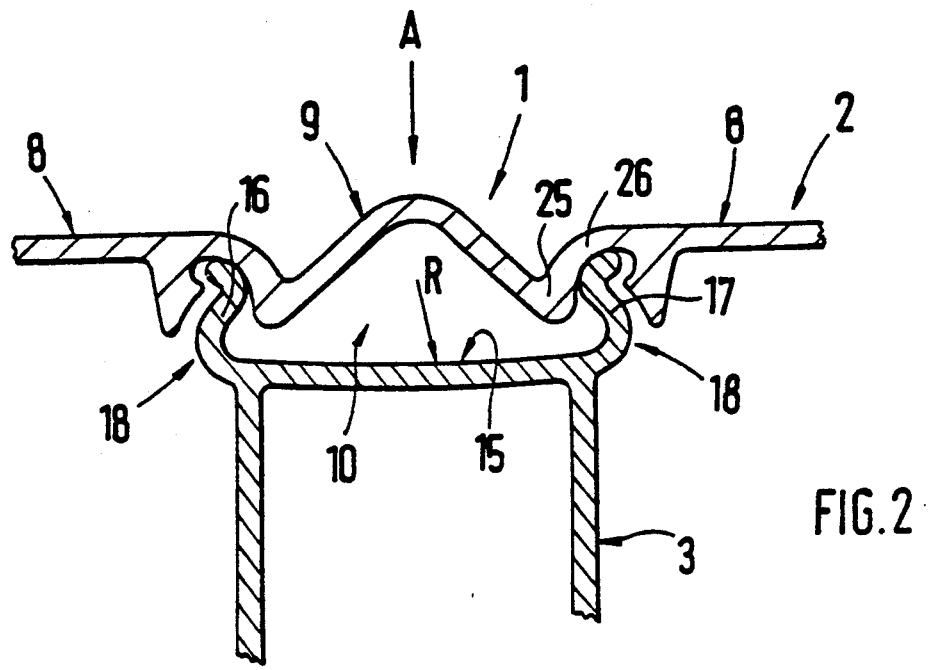
FIG. 2 is an enlarged detail X of FIG. 1 in the mounted condition.

According to FIG. 1, groove-shaped receiving devices 10 are provided on the top side as well as on the bottom side of the profile part 3, 3a, 3b. Each receiving device 10 comprises a floor portion 15 and lateral boundaries 16, 17, the undercuts 13, 14 being developed in the area of the lateral boundaries 16, 17 (FIGS. 2 and 6). At least one lateral boundary (for example, 16) of the receiving device 10 is formed by a thin-walled, approximately S-shaped molded-on part 18 of the profile part 3, 3a, 3b. The molded-on part 18 comprises two circular-arc-shaped portions 19, 20, the origin points of the radii (R1, R2) of the two portions 19, 20 being situated on opposite sides of the molded-on part 18 (FIG. 6).

A first portion 19 is tangentially connected to the floor portion 15 of the receiving device 10, in which case the origin point of the radii R1 extends inside the receiving device 10. The origin point of the radii R2 of the connecting second portion 20 is situated outside the receiving device 10. The free end 21 of the second portion 20, in each case, is directed toward the outside. The first portion 19 connected to the floor portion 15 has a slightly smaller radius than the connecting second portion 20.

For the profile parts 3, the respective two lateral boundaries 16, 17 are constructed as S-shaped molded-on parts 18, the two molded-on parts 18 being constructed mirror-invertedly with respect to one another. However, in the case of the exterior profile parts 3a, 3b, in each case, only one lateral boundary, for example 16, is constructed as an S-shaped molded-on part 18.

The floor portion 15 of the receiving device 10, viewed in the working direction A of a pressure piston of a pressing tool, has an inwardly arched concave shape which is constructed in the shape of radii. During the deforming of the holding web 9, this holding web 9 is pressed downward until its rests on the floor portion 15. Subsequently, the holding web 9 springs back again by a small amount and then takes up an approximately straight, stretched, horizontal position.

Figure 4:
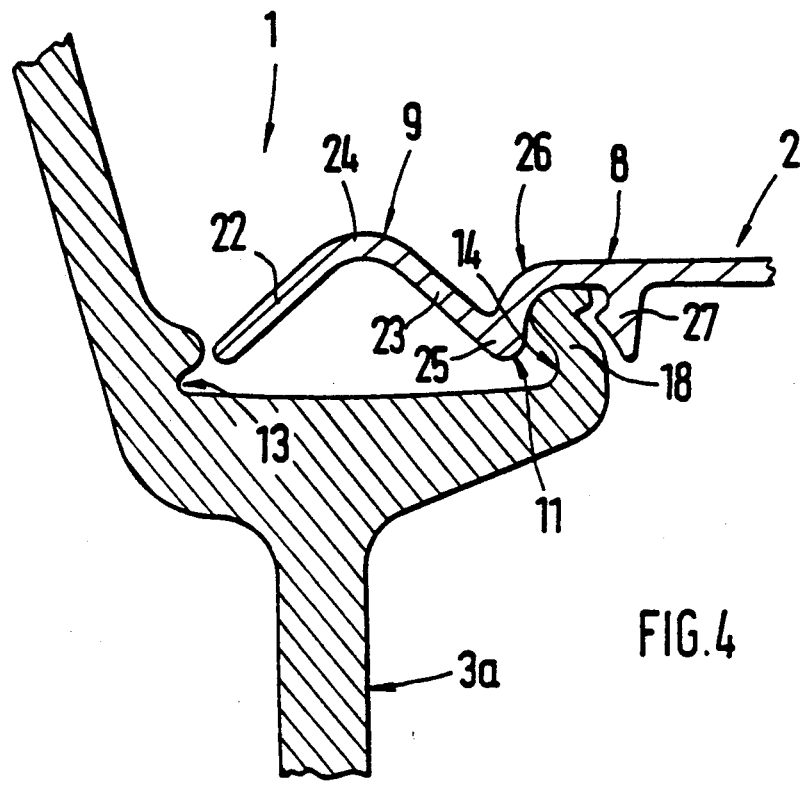
FIG. 4 is an enlarged detail Y of FIG. 10.

The deformable holding web 9, in the delivery condition of the plate-shaped element 2, 2a, is constructed to be approximately roof-shaped or V-shaped, in which case the two obliquely directed wall portions 22, 23 are connected with one another by way of a radii-shaped transition area 24 (FIGS. 4 and 7).

The two wall portions 22, 23 of the holding web 9 are aligned approximately at a right angle with respect to one another. The radii-shaped transition area 24, in the delivery condition, viewed in the vertical direction, projects slightly beyond the plane wall sections 8, whereas the wall portions 11, 12 extend in a sunken manner with respect to the plane of the wall portions 8.

Figure 3:
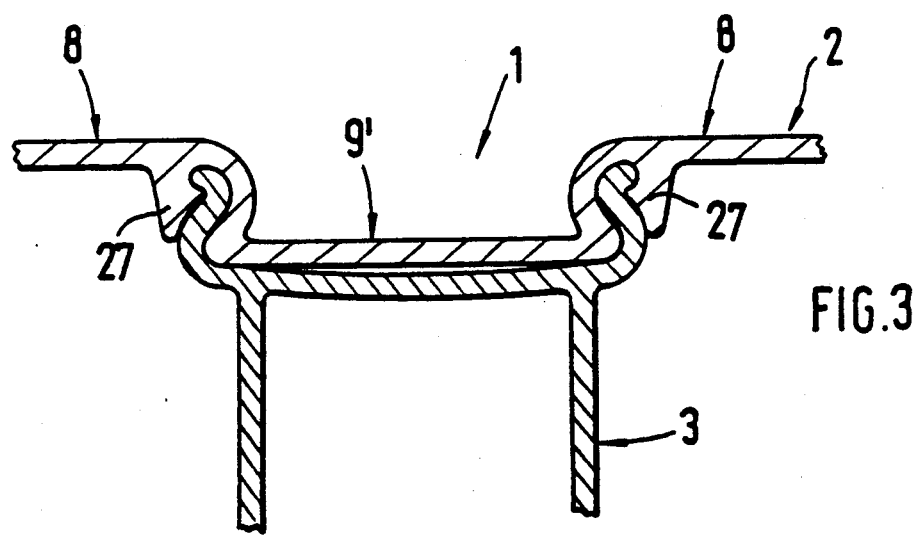
FIG. 3 is a view corresponding to FIG. 2 in a joined position of the compound element.
Figure 5:
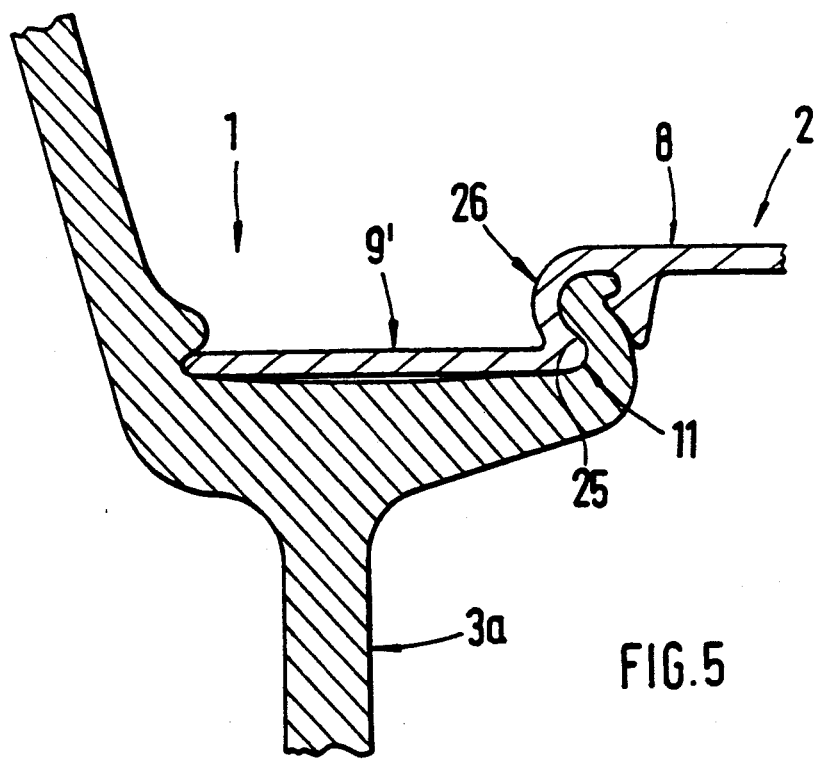
FIG. 5 is a view corresponding to FIG. 4 in a joined condition of the compound element.

In the deformed condition, the holding web 9 according to FIGS. 3 and 5 assumes a stretched straight shape (position 9') and, by means of the edge portions 11, 12, reaches behind the lateral undercuts 13, 14 of the receiving device 10. At least on one edge portion, for example 11, of the holding web 9, a cross-sectional widening 25 is provided which is adapted to the shape of the undercut 13, 14. When the compound element 1 is joined, the cross-sectional widening 25 completely fills up the space of the undercut 13, 14.

Between the edge portion 11, 12 of the holding web 9 and the exterior flat wall portion 8 of the plate-shaped element 2, 2a, a bent transition area 26 is provided which is constructed in the shape of radii. The origin point of the radii R3 of the transition area 26 is situated on the side facing away from the holding web 9, specifically below the upper wall portion 8.

The approximately quarter-circle-shaped transition area 26 connects the interior cross-sectional widening 25 of the holding web 9 with the flat exterior wall portion 8 of the plate-shaped element 2, 2a. For a joined compound element 1, the bent transition area 26 rests form-fittingly against the interior side of the S-shaped molded-on part 18 (FIGS. 3 and 5).

In addition, at least on one side of an edge portion 11, 12 of the holding web 9, a molded-on, downward-projecting supporting arm 27 is provided on the plate-shaped element 2, 2a, in which case, when the compound element 1 is joined, a lateral boundary 16, 17 of the receiving device 10 (S-shaped molded-on part 18) is clamped in between the supporting arm 27 and the deformed holding web 9.

Adjacent to both edge portions 11, 12 of the holding web 9, supporting arms 27 are preferably provided on the plate-shaped element 2, 2a. Each supporting arm 27 extends at a narrow distance to the adjacent curved transition area 26 or to the edge portion 11, 12 of the holding web 9. On the side facing the molded-on part 18 of the profile part 3, 3a, 3b, each supporting arm has a supporting shoulder 28 and a nose 29. The supporting shoulder 28 and the nose 29 are adapted to the shaping of the molded-on part 18 and, when the compound element 1 is joined, form-fittingly rest against the exterior side of the molded-on part 18.

By means of the supporting shoulder 28, a lateral bending-away of the molded-on part 18 is prevented during the deforming of the holding web 9. A lower end of the supporting arm 27, in the delivery condition of the plate-shaped element 2, 2a, extends approximately at the same level as the edge portions 11, 12 of the holding web 9.

The connection between the plate-shaped element 2, 2a and the profile part 3, 3a, 3b takes place in such a manner that the plate-shaped element or elements 2, 2a are loosely placed on the prepositioned profile parts 3, 3a, 3b. In this case, each holding web 9, in portions, engages in the corresponding receiving device 10 of the profile part 3, 3a, 3b, whereas the lateral supporting arms 27 of the plate-shaped element 2, 2a extend at a lateral distance to the S-shaped molded-on parts 18 of the profile part 3, 3a, 3b. Subsequently, each holding web 9, by means of a pressure piston, which is not shown, is pressed downward, until the holding web 9 assumes a stretched, straight shape and the edge portions 11, 12 reach behind the undercuts 13, 14 of the receiving device 10. Conventional holding-down devices, not shown, are used for supporting the flat wall portions 8 of the plate-shaped element or elements 2, 2a during the deforming of the holding webs 9. As a result, the lateral-S-shaped molded-on parts 18 of the profile parts 3, 3a, 3b are moved in the direction of the supporting arms 27 and come to rest against them in a form-fitting manner.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A compound element comprising:

at least one plate-shaped element having substantially flat, exterior wall portions and a profiled deformable holding web that has edge portions, the plate-shaped element formed by an extruded profile made of light metal and having a molded-on downward-projecting supporting arm, said holding web being freely accessibly arranged adjacent to the wall portions of the plate-shaped element, said edge portions having a cross-sectional widening and a curved transition area; and an oblong profile part formed by an extruded profile and having a receiving device corresponding to the holding web, said receiving device having at least one lateral boundary formed by a thin-walled, approximately S-shaped molded-on part of the profile part, said holding web interacting with the receiving device of the profile part in such a manner that by the deformation of the holding web, a form-fitting joined connection of the compound element is formed;

wherein the cross-sectional widening, the curved transition area, and the downward-projecting supporting arm encloses both sides of the S-shaped molded-on part of the profile part in a form-fitting manner when the compound element is formed.

2. A compound element according to claim 1, wherein the molded-on part of the profile part comprises first and second circular-arc-shaped portions placed against one another, origin points of the radii of the first and second portions being situated on opposite sides of the molded-on part of the profile part.

3. A compound element according to claim 2, wherein the receiving device includes a floor portion and the origin point of the radii of the first portion connecting the floor portion of the receiving device is situated inside the receiving device, with the origin point of the radii of the second portion being situated outside the receiving device.

4. A compound element according to claim 3, wherein the floor portion of the receiving device is curved slightly toward the inside.

5. A compound element according to claim 2, wherein the first portion connecting to the floor portion has a smaller radius than the second portion directed toward the outside.

6. A compound element according to claim 5, wherein the floor portion of the receiving device is curved slightly toward the inside.

7. A compound element according to claim 1, wherein the receiving device has a floor portion, and wherein the deformable holding web has obliquely directed wall portions, and in a delivery condition of the extruded profile, extends approximately V-shaped with respect to the floor portion of the receiving device, the two obliquely directed wall portions being connected with one another by a radii-shaped transition area.

8. A compound element according to claim 7, wherein the receiving device has a lateral undercut, and wherein the deformed holding web assumes a stretched straight shape that reaches behind the lateral undercuts of the receiving device.

9. A compound element according to claim 1, wherein the receiving device includes at least one undercut, adapted to the shape of the undercut.

10. A compound element according to claim 1, wherein an origin point of the radii of the curved transition area is situated between the cross-sectional widening and the exterior supporting arm and below the flat wall portion.

11. A compound element according to claim 10, wherein the curved transition area, when the compound element is joined, form-fittingly rests against an interior side of the S-shaped molded-on part.

12. A compound element according to claim 1, wherein the supporting arm of the plate-shaped element has a supporting shoulder and a nose, the supporting shoulder and the nose, when the compound element is joined, resting against the exterior side of the S-shaped molded-on part.

13. A compound element according to claim 1, wherein the receiving device includes lateral undercuts, and wherein the deformed holding web assumes a stretched straight shape, reaching behind the lateral undercuts of the receiving device.

14. A method of manufacturing a compound element which has at least one plate-shaped element having substantially flat, exterior wall portions and a profiled deformable holding web that has edge portions, the plate-shaped element being formed by an extruded profile made of light metal, said holding webs being freely accessibly arranged adjacent to the wall portions of the plate-shaped element, and an oblong profile part formed by an extruded profile and having a receiving device corresponding to the holding web, said receiving device having undercuts and an S-shaped molded-on part, said holding web interacting with the receiving device of the profile part in such a manner that by deformation of the holding web, a form-fitting joined connection of the compound element is formed, in which the edge portions of the holding web laterally reach behind the undercuts of the receiving device, the plate-shaped element having a molded-on downward-projecting supporting arm, the edge portions having a cross-sectional widening and a curved transition area, the method comprising the steps:

loosely placing at least one plate-shaped element on profile parts that have been pre-positioned such that the supporting arm, the cross-sectional widening and the curved transition area are on both sides of the S-shaped molded-on part;

deforming the holding webs of the plate-shaped element to form a form-fitting joined connection of the supporting arm, the cross-sectional widening and the curved transition area to the S-shaped molded-on part;

supporting the flat wall portions of the plate-shaped element during the step of deforming the holding webs.

15. The method according to claim 14, wherein the step of deforming is performed by a pressure piston.

16. The method according to claim 15, wherein the step of supporting is performed by holding-down devices.

* * * * *